(12) United States Patent
Schultz et al.

(10) Patent No.: US 11,753,245 B1
(45) Date of Patent: Sep. 12, 2023

(54) PHARMACEUTICAL CONTAINER HOLDER

(71) Applicant: Express Scripts Strategic Development, Inc., St. Louis, MO (US)

(72) Inventors: Richard A. Schultz, Sellersville, PA (US); Edward E. West, Sewell, NJ (US); Scott Walter, Maple Shade, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 200 days.

(21) Appl. No.: 17/093,831

(22) Filed: Nov. 10, 2020

(51) Int. Cl.
  *B65G 59/02* (2006.01)
  *B65G 1/137* (2006.01)
  *B65G 59/10* (2006.01)
  *B65G 1/04* (2006.01)
  *B65G 47/91* (2006.01)
  *B25J 15/06* (2006.01)

(52) U.S. Cl.
  CPC ......... *B65G 1/1373* (2013.01); *B65G 1/0464* (2013.01); *B65G 47/91* (2013.01); *B65G 59/026* (2013.01); *B65G 59/10* (2013.01); *B25J 15/0683* (2013.01); *B65G 2201/0235* (2013.01); *B65G 2203/0233* (2013.01); *B65G 2203/0283* (2013.01)

(58) Field of Classification Search
  CPC ...... B65G 47/91; B65G 59/026; B65G 59/10; B65G 2201/0235; B65G 2203/0233; B65G 1/07; B65G 1/0464
  USPC ......... 414/796.5, 796.7, 796.9, 797; 211/184
  See application file for complete search history.

(56) References Cited

U.S. PATENT DOCUMENTS

| | | | | |
|---|---|---|---|---|
| 3,167,369 A | * | 1/1965 | Haag | B65G 1/07 312/71 |
| 5,819,954 A | * | 10/1998 | Lacriola | B07C 5/3412 414/744.2 |
| 6,311,867 B1 | * | 11/2001 | Yamamiya | B65H 1/14 221/217 |
| 6,805,528 B2 | * | 10/2004 | Monti | B65B 57/14 414/797 |
| 7,726,106 B2 | | 6/2010 | Kelley | |
| 8,257,507 B2 | | 9/2012 | Ng | |
| 9,199,803 B1 | * | 12/2015 | Morris | B65G 59/026 |
| 9,207,249 B2 | | 12/2015 | Greenstein | |
| 9,346,631 B2 | * | 5/2016 | Haehnel | B65G 47/04 |
| 9,610,219 B1 | * | 4/2017 | Basso | B26F 1/40 |
| 9,944,419 B2 | | 4/2018 | Joplin | |

(Continued)

*Primary Examiner* — Lynn E Schwenning
(74) *Attorney, Agent, or Firm* — Stinson LLP

(57) ABSTRACT

A pharmaceutical container holder for holding pharmaceutical containers includes a receiver having an interior sized and shaped to receive and hold the pharmaceutical containers as a stack of pharmaceutical containers. The receiver has a removal location from which the pharmaceutical containers are removed from the receiver. A lift raises the pharmaceutical containers disposed in the interior of the receiver upward to move the pharmaceutical containers toward the removal location. A lift controller operates the lift to move the pharmaceutical containers upward toward the removal location after an upper-most pharmaceutical container of the stack of pharmaceutical containers has been removed from the removal location to move a subsequent upper-most pharmaceutical container of the stack of pharmaceutical containers to the removal location.

23 Claims, 10 Drawing Sheets

(56) References Cited

U.S. PATENT DOCUMENTS

| | | | |
|---|---|---|---|
| 9,978,036 B1* | 5/2018 | Eller | G06Q 30/06 |
| 10,332,778 B2 | 6/2019 | Pohl | |
| 10,535,549 B2 | 1/2020 | Nguyen | |
| 10,632,762 B2 | 4/2020 | Obata | |
| 10,788,264 B2 | 9/2020 | Procyshyn | |
| 2005/0133729 A1 | 6/2005 | Woodworth | |
| 2008/0226438 A1* | 9/2008 | Fischereder | B21D 43/24 |
| | | | 414/796.4 |
| 2011/0200419 A1* | 8/2011 | Yamasaki | G01N 35/04 |
| | | | 414/796.9 |
| 2012/0213617 A1* | 8/2012 | Winkler | B65G 1/1376 |
| | | | 220/4.01 |
| 2019/0016520 A1 | 1/2019 | Netzhammer | |
| 2020/0088467 A1 | 3/2020 | Procyshyn | |

* cited by examiner

PHARMACEUTICAL CONTAINER HOLDER

FIELD

The present disclosure generally relates to pharmacy order processing systems, and more particularly to holders for holding pharmaceutical containers, such as pouches or other irregular shaped containers, processed by pharmaceutical order processing systems.

BACKGROUND

High volume pharmacies process and fulfill a large number of prescription orders per day. These pharmacies often rely on automated systems to process, fill, and pack one or more prescriptions together for delivery to a patient. Some of the automated systems are configured to dispense unit of use products. A unit of use product is made for dispensing a drug to a patient without product packaging modification (or with minimal product packaging modification) except for labeling with patient information. Unit of use products can include a full course of medicine to be taken by a patient, for example, an entire prescription (e.g., a thirty-day supply, a sixty-day supply, or a ninety-day supply). The unit of use products contain known quantities of medication in packages that are closed and sealed by, for example, the pharmaceutical manufacturer. Conventional unit of use systems are limited to dispensing a unit of use bottle, or similar type of unit of use containers, which are typically placed in a dedicated channel until the bottle is removed and processed by the unit of use system.

BRIEF SUMMARY

In one aspect, a pharmaceutical pouch holder for holding pharmaceutical pouches for a pharmaceutical order processor comprises a receiver having an interior sized and shaped to receive and hold the pharmaceutical pouches as a stack of pharmaceutical pouches. The receiver has a removal location adjacent an upper end of the receiver and from which the pharmaceutical pouches are removed from the receiver. A lift is configured to raise the pharmaceutical pouches disposed in the interior of the receiver upward to move the pharmaceutical pouches toward the removal location adjacent the upper end of the receiver. A lift controller is configured to operate the lift to move the pharmaceutical pouches upward toward the removal location after an uppermost pharmaceutical pouch of the stack of pharmaceutical pouches has been removed from the removal location to move a subsequent upper-most pharmaceutical pouch of the stack of pharmaceutical pouches to the removal location.

In another aspect, a pharmaceutical pouch holder for holding pharmaceutical pouches for a pharmaceutical order processor comprises a cartridge having a pouch interior sized and shaped to receive and hold the pharmaceutical pouches as a stack of pharmaceutical pouches. The cartridge has a lift opening and an upper opening sized and shaped to permit the pharmaceutical pouches to be removed from the cartridge. A receiver has a cartridge interior sized and shaped to receive and hold the cartridge. A lift is movable in the lift opening and is configured to engage the stack of pharmaceutical pouches to raise the pharmaceutical pouches disposed in the interior of the cartridge upward to move the pharmaceutical pouches toward the upper opening.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
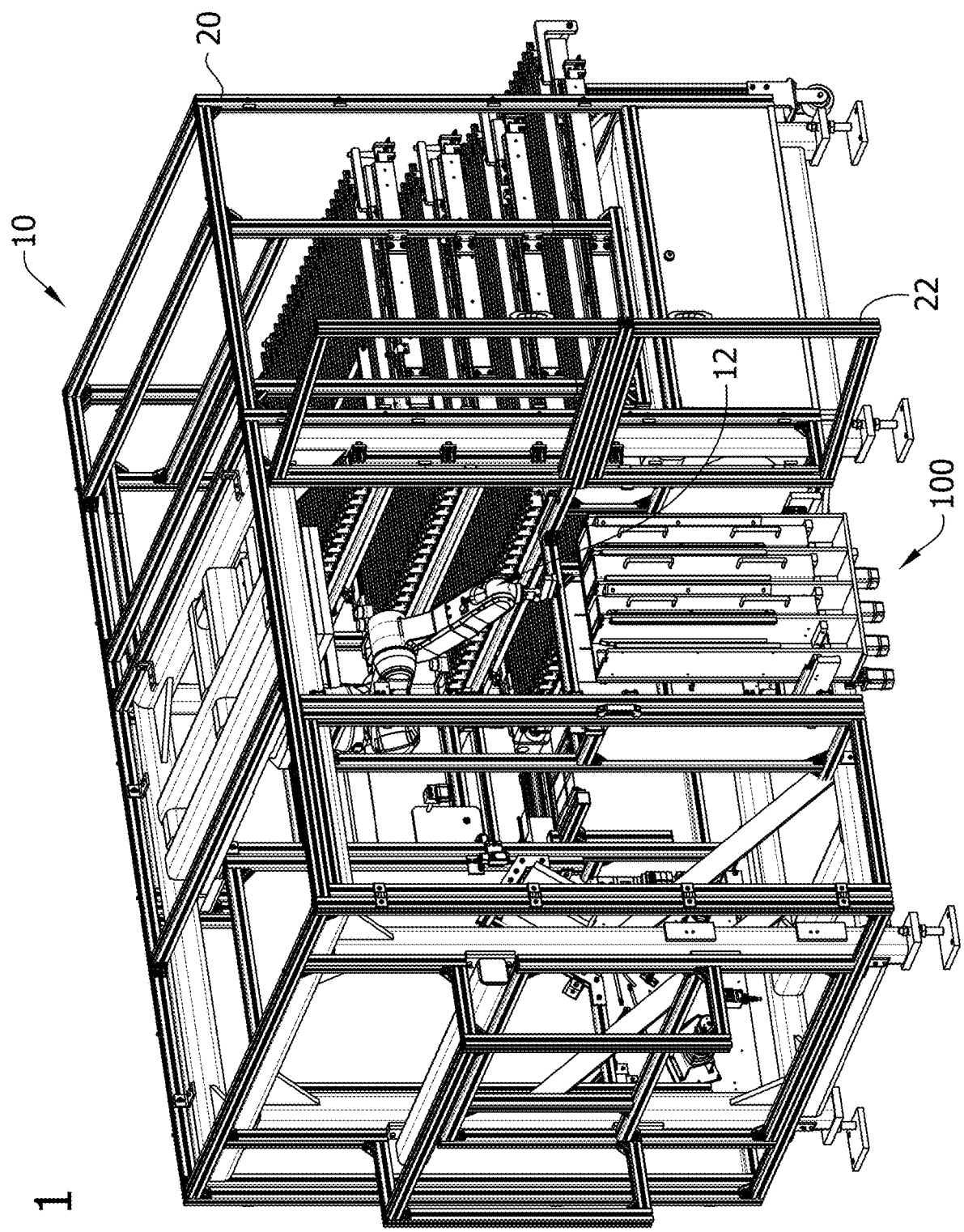
FIG. 1 is a perspective of a pharmaceutical container processor including a pharmaceutical pouch holder according to one embodiment of the present disclosure, with the pharmaceutical pouch holder in a loading position.
Figure 2:
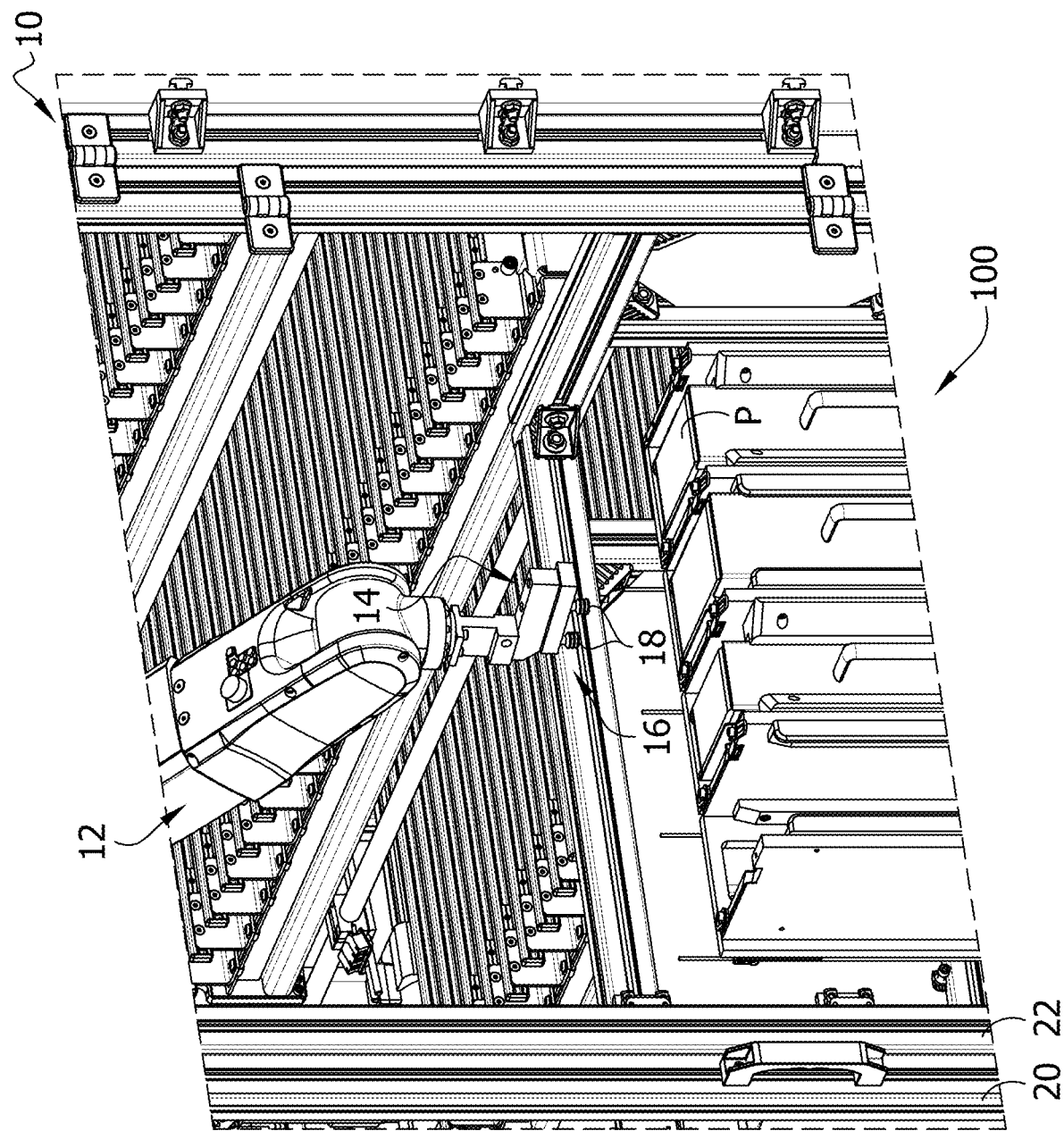
FIG. 2 is an enlarged perspective of the pharmaceutical container processor of FIG. 1 with the pharmaceutical pouch holder in a supply position.

Referring to FIGS. 1 and 2, a pharmaceutical pouch holder according to one embodiment of the present disclosure is generally indicated by reference numeral 100. In the exemplary embodiment, the pharmaceutical pouch holder 100 is shown mounted to a pharmaceutical order processor 10. The holder 100 holds and stores pharmaceutical containers, and specifically pharmaceutical pouches P, for processing by the pharmaceutical order processor 10. The pharmaceutical order processor 10, as needed, grabs and removes the pharmaceutical pouches P from the holder 100 to process and fill prescription orders. As used herein, the term "pouch" includes any type of generally planar-shaped pharmaceutical holding object, such as but not limited to a foil pack (e.g., a blister pack), an envelope, a package, a box, a case, a packet, etc. In an example embodiment, the pouch P has an irregular shape that does not lend itself to stacking (e.g., a plurality of vertically stacked pouches (if able to be stacked) does not form a regular parallelepiped shaped). It is understood, the holder 100 described herein can be used to hold other types of pharmaceutical holding objects, such as but not limited to bottles (e.g., pharmaceutical pill bottles). Generally, the holder 100 described herein can be used to hold any type of pharmaceutical container that can be stacked on top of one another.

The pharmaceutical order processor 10 is part of a pharmaceutical container processing system, such as a high volume pharmaceutical order processing system, to facilitate the fulfillment of prescription orders received by the pharmaceutical order processing system. The prescription order may include one or more pharmaceuticals (e.g., prescription drugs), which are contained in the pharmaceutical pouches P. In the illustrated embodiment, the pharmaceutical order processor 10 is a unit of use system and the pharmaceutical pouches P are unit of use products. As generally known in the art, a unit of use system 10 temporarily stores, monitors, labels and dispenses unit of use products. By adding the pharmaceutical pouch holder 100 of the present disclosure to the unit of use system 10, the unit of use system 10 is able to process (e.g., store, monitor, label and dispense) pharmaceutical pouches P, unlike conventional unit of use systems. However, it is understood that the pharmaceutical pouch holder 100 may be used with other types of pharmaceutical order processors besides unit of use systems. Further details on pharmaceutical order processing systems and components thereof, including unit of use systems, may be found in U.S. Pat. Nos. 9,978,036 and 9,944,419, the entireties of which are hereby incorporated by reference. However, it will be appreciated that the systems and components disclosed herein can be used in other contexts without departing from the scope of the present disclosure.

The pharmaceutical order processor 10 removes the pharmaceutical pouches P from the holder 100 to fill prescription orders. The pharmaceutical order processor 10 includes a transporter 12 (e.g., a pouch transporter) configured to remove the pharmaceutical pouches P from the holder 100. The transporter 12 is configured to pick up the pharmaceutical pouches P from a removal location defined by the holder 100. The transporter 12 then moves the picked up pharmaceutical pouch P to another location for further processing. The transporter 12 can comprise a robot such as a six-axis robotic arm, a selective-compliance-articulated robotic arm, a cylindrical robot, a delta robot, a polar coordinate robot, a vertically articulated robot, a Cartesian coordinate robot or any other suitable device. The transporter 12 includes a gripper 14 configured to grip (e.g., grab, pick up) each pharmaceutical pouch P (e.g., from a top of a stack of pouches P). In the illustrated embodiment, the gripper 14 includes a suction head 16 configured to apply suction to each pharmaceutical pouch P to grip the pharmaceutical pouch. The suction head 16 is fluidly connected to a source of negative pressure (not shown), such as a vacuum source. The suction head 16 desirably includes at least two bellow suction cups 18 for gripping the pharmaceutical pouches P. The bellow suction cups 18 enable the gripper 14 to grab pharmaceutical pouches P even if the pouch is not lying perfectly horizontal at the picking location. Due to the construction of certain pharmaceutical pouches P, the pharmaceutical pouches may lay at an angle, such as about 15 degrees, relative to horizontal when the pouches are stacked on top of each other, as described in more detail below. The suction head 16 of the gripper 14 allows the transporter to grab and remove the stacked pharmaceutical pouch P regardless of the angle the stacked pouch is at relative to the horizontal. Other configurations of the transporter and components thereof (e.g., the gripper) are within the scope of the present disclosure.

Figure 3:
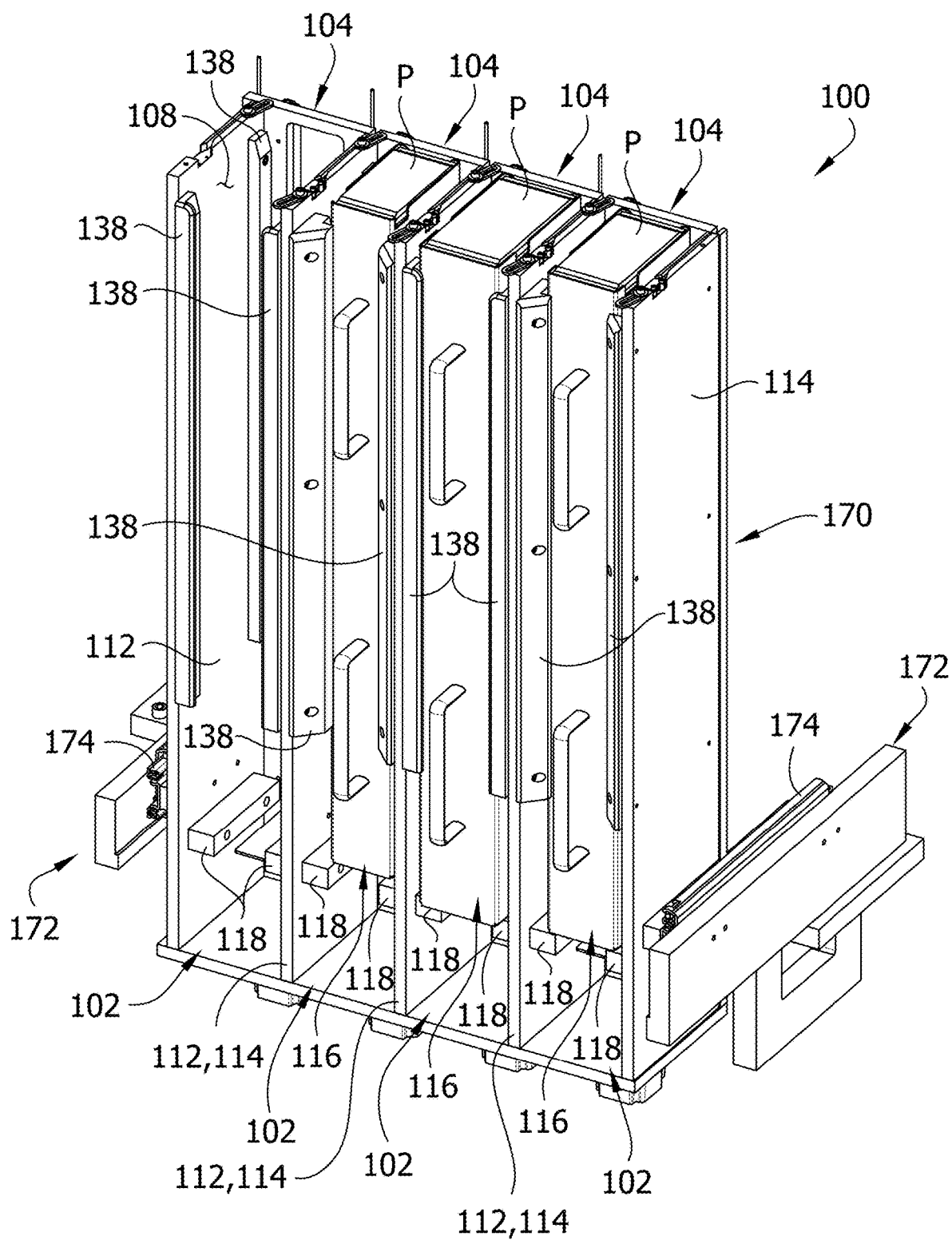
FIG. 3 is front perspective of the pharmaceutical pouch holder.
Figure 4:
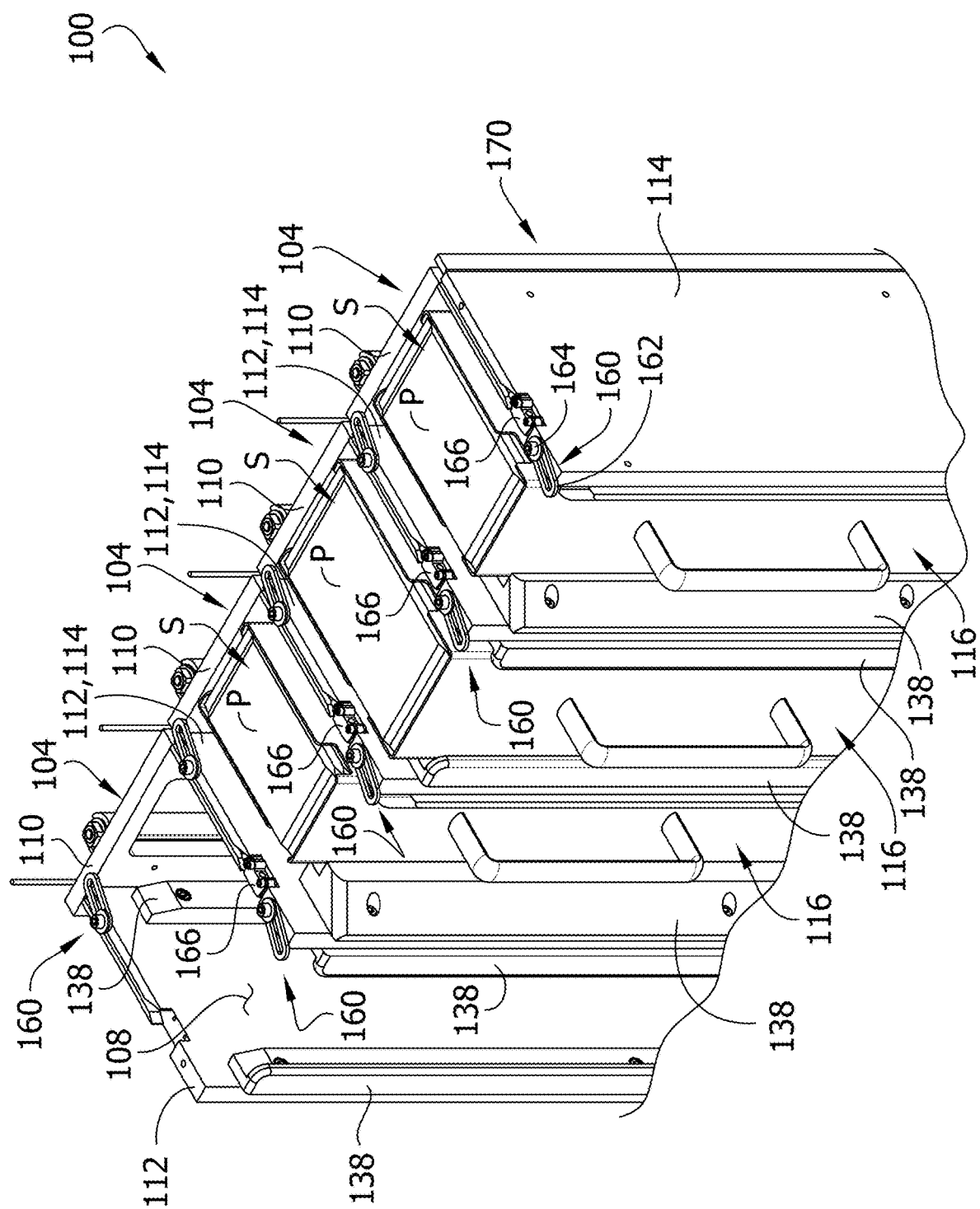
FIG. 4 is an enlarged perspective of the upper end of the pharmaceutical pouch holder.
Figure 5:
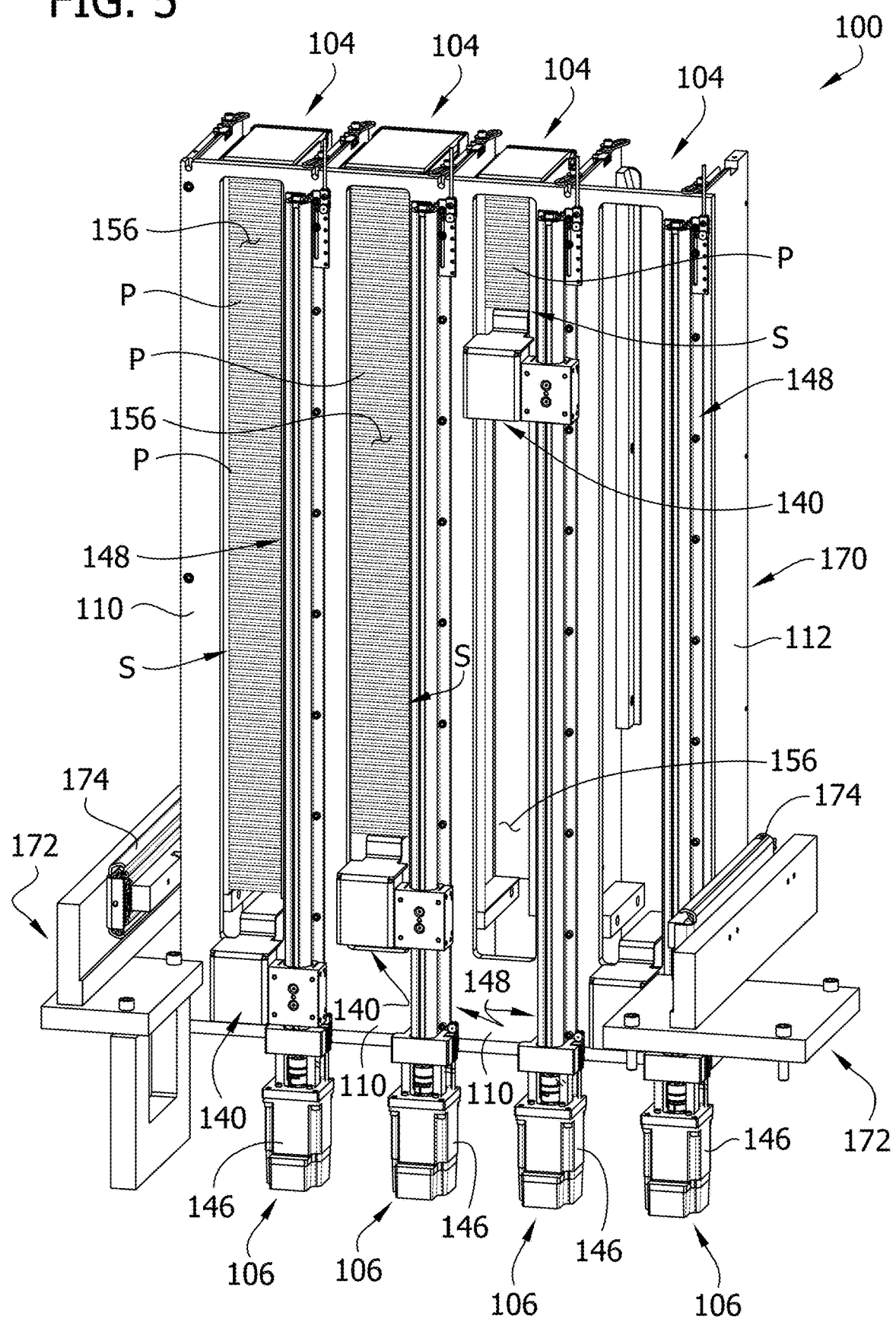
FIG. 5 is a rear perspective of the pharmaceutical pouch holder.

Referring to FIGS. 3-5, the holder 100 is configured to hold and store (e.g., temporarily store) the pharmaceutical pouches P for filling orders received by the pharmaceutical order processing system. In other words, the holder 100 holds and stores the pharmaceutical pouches P until the pouches are removed by the pharmaceutical order processor 10 to fill a prescription order. The holder 100 includes one or more holding assemblies 102. Each holding assembly 102 is configured to store a stack S of pharmaceutical pouches P and move the stack as pharmaceutical pouches are removed by the pharmaceutical order processor 10. In the illustrated embodiment, the holder 100 includes four holding assemblies 102, although the holder may include more or fewer holding assemblies. The four holding assemblies 102 of the holder 100 are arranged next to one another in a single row. Other arrangements of the holding assemblies 102 are within the scope of the present disclosure.

The holding assemblies 102 are generally identical. Accordingly, one holding assembly 102 will be described in further detail below with the understanding that the other holding assemblies have essentially the same construction. The holding assembly 102 includes a receiver 104 and a lift 106. The receiver 104 has an interior 108 that is, broadly, sized and shaped to receive and hold the pharmaceutical pouches P as a stack S of pharmaceutical pouches. The receiver 104 includes a rear wall 110 (e.g., rear surface) and opposite left and right (e.g., first and second) side walls 112, 114 (e.g., sides surfaces) at least partially defining the interior 108. The left and right side walls 112, 114 extend forward from opposite sides (e.g., side edge margins) of the rear wall 110. In the illustrated embodiment, the interior 108 has a generally rectangular cross-sectional (e.g., horizontal) shape to correspond to the generally rectangular shape of the pharmaceutical pouches P, although other shapes are within the scope of the present disclosure. The other shapes can include other parallelepiped shaped other than rectangular. The pouches P can have a regular shape in the X-Y (e.g., horizontal) plane and be irregular in the Z plane (e.g., height or thickness dimensions). The interior 108 is elongate and is configured to hold the stack S of pharmaceutical pouches P.

The receiver 104 includes (e.g., defines) a removal location adjacent (e.g., at) an upper end of the receiver. The removal location is the location from which the pharmaceutical pouches P are removed from the receiver 104 by the pharmaceutical order processor 10. Specifically, the transporter 12 moves the gripper 14 to grip the pharmaceutical pouch P at the removal location and remove (e.g., pick up) the pouch from the holder 100. In an example embodiment, the removal location is at the top of the receiver 104 and the gripper 14 descends generally vertically downward to contact an upper surface of the uppermost pouch P. As will be explained in more detail below, the lift 106 moves the stack S of pharmaceutical pouches P upward so that the uppermost pharmaceutical pouch (e.g., the pouch on top of the stack) is disposed at the removal location. The upper-most pharmaceutical pouches P of each stack S visible in FIGS. 2 and 4 are shown in the removal location for their respective receivers 104.

The holding assembly 102 may also include a cartridge 116 (e.g., a pouch cartridge), as shown in the illustrated embodiment. The cartridge 116 holds and stores the stack S of pharmaceutical pouches P. In this embodiment, the receiver 104 is configured to receive the cartridge 116. The interior 108 of the receiver 104 is sized and shaped to receive and hold the cartridge 116. The receiver 104 includes at least one support 118 that supports the cartridge 116 (broadly, the stack S of pharmaceutical pouches P). In the illustrated embodiment, the receiver 104 includes first and second supports 118, each extending into the interior from one of the left or right side walls 112, 114. The first and second supports 118 are spaced apart and define a gap (e.g., support gap) therebetween in the interior 108 of the receiver 104. The cartridge 116 is sized and shaped to be inserted into the interior 108 of the receiver 104. When disposed in the receiver 104, the cartridge 116 rests on the first and second supports 118. The interior 108 of the receiver 104 has an open upper end (e.g., upper opening) to permit the pharmaceutical pouches P to be removed from the interior by the pharmaceutical order processor 10. The open upper end of the interior 108 also allows the cartridge 116 to be inserted into the receiver 104 by sliding the cartridge downward into the interior through the open upper end and allows the cartridge to be removed from the receiver 104 by sliding the cartridge upward through the open upper end and out of the interior. The cartridge 116 can be filled with pouches P remote from the receiver 104 and then inserted into the receiver.

Figure 6:
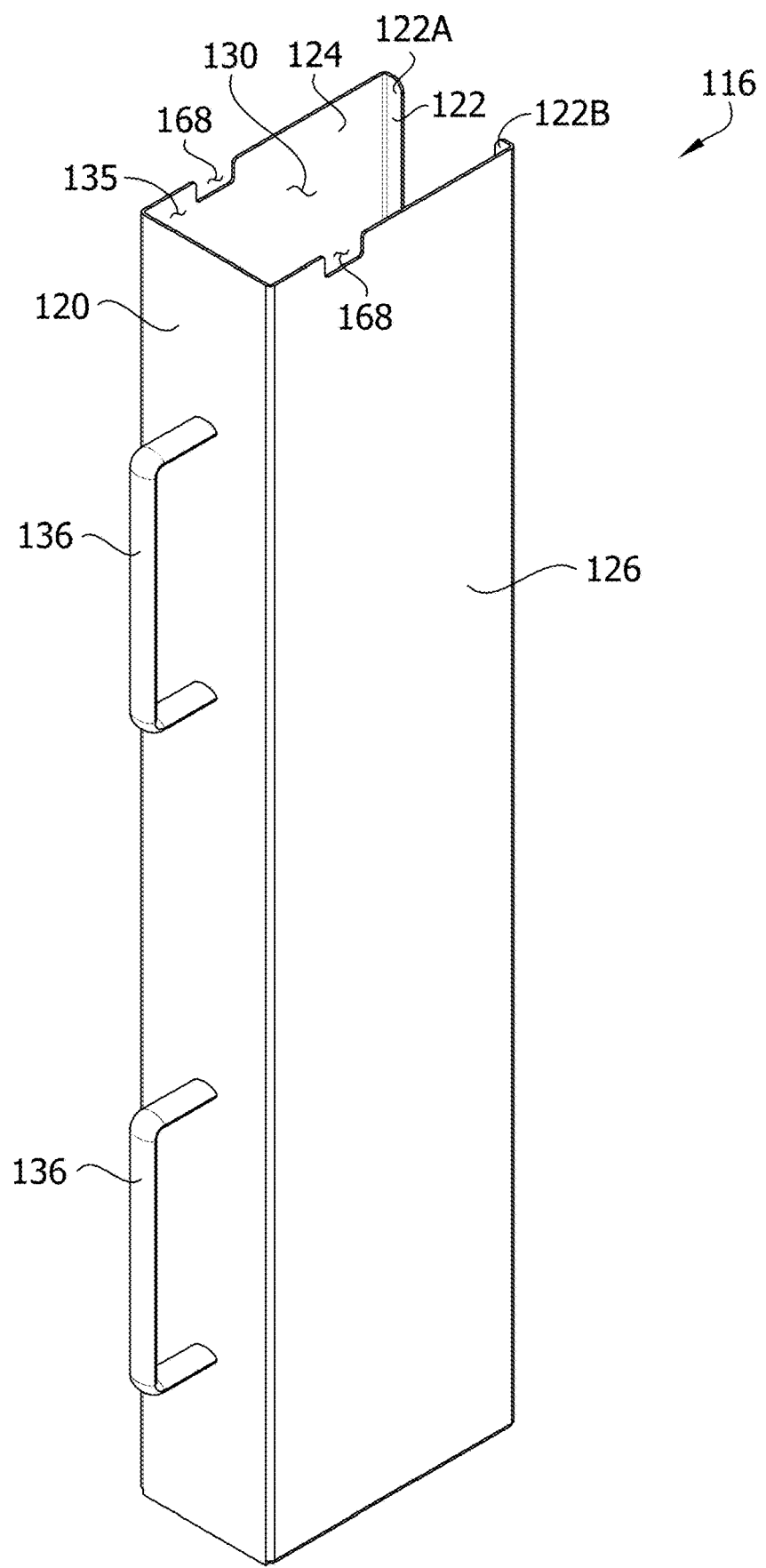
FIG. 6 is front perspective of a cartridge of the pharmaceutical pouch holder.
Figure 7:
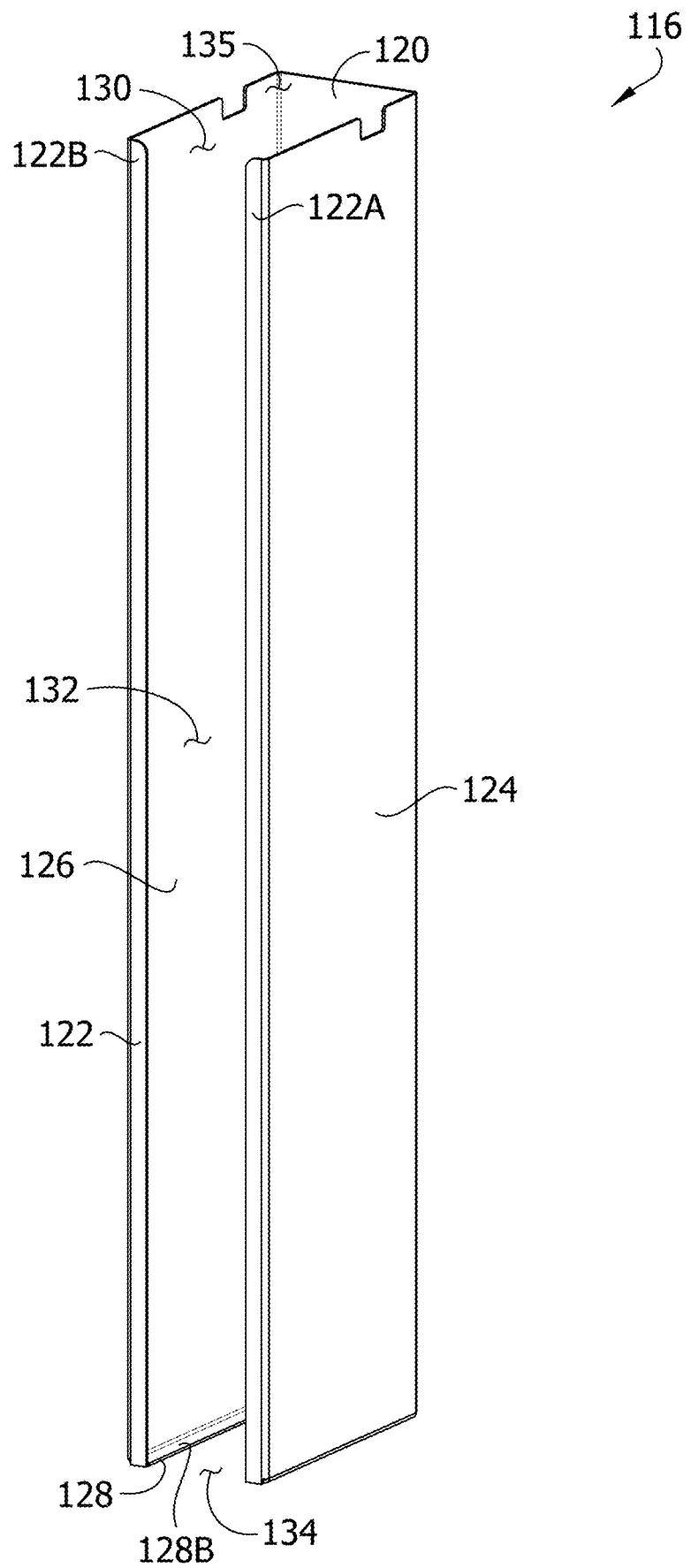
FIG. 7 is a rear perspective of the cartridge.

Referring to FIGS. 6 and 7, the cartridge 116 has a front wall 120, a rear wall 122, and left and right (e.g., first and second) side walls 124, 126. The front wall 120, rear wall 122 and side walls 124, 126 support the stack S of the pharmaceutical pouches P and prevents the stack from falling over. As mentioned above, the pharmaceutical pouches P may not lay completely horizontally, causing the stack S to lean and possibly fall over if not supported along its height. The tendency of the stack S to tip or to lean can be due to the irregular shape of the pouches P in at least one dimension (e.g., in the height dimension relative to the receiver 104). The cartridge 116 also includes a base 128 (e.g., base wall). The front wall 120, the rear wall 122, the left and right side walls 124, 126, and the base 128 define an interior 130 of the cartridge 116. The interior 130 of the cartridge 116 is sized and shaped to receive and hold the stack S of the pharmaceutical pouches P. In the illustrated embodiment, the interior 130 has a generally rectangular cross sectional shape to correspond to the generally rectangular shape of the pharmaceutical pouches P, although other shapes (e.g., parallelepiped in cross section) are within the scope of the present disclosure. In an example embodiment, the walls 120, 122, 124, 126 are elongate in the vertical direction. The base 128 defines the lower end of the interior 130 and engages and supports the lower-most pharmaceutical pouch P of the stack S. The cartridge 116 includes (e.g., defines) an upper opening 135 sized and shaped to permit the pharmaceutical pouches P to be removed from the cartridge. The upper opening 135 is disposed adjacent to (e.g., at) the upper end of the cartridge 116. The upper opening 135 is in open communication with the interior 130. In other words, the upper opening 135 is the open, upper end of the interior 130. The upper opening 135 is generally co-extensive with the removal location of the receiver 104 when the cartridge 116 is disposed in the receiver. Accordingly, the pharmaceutical pouch P generally lays within or is disposed adjacent to (e.g., immediately below) the upper opening 135 when the pharmaceutical pouch is in the removal location. To remove the pharmaceutical pouch P from the holder 100, the transporter 12 of the pharmaceutical order processor 10 may extend into (and through) the upper opening 135 to grab the pouch. The pharmaceutical pouch P may extend into the upper opening with its irregularly shaped side and at least a portion of the bottom side remaining in the interior 130. The irregularly shaped side of the pouch P may be gripped by the gripper 14.

The rear wall 122 of the cartridge 116 includes (e.g., defines) a rear lift opening 132. The rear lift opening 132 extends from the lower end (e.g., edge margin) of the rear wall 122 to the upper end of the rear wall (e.g., along the entire height of the rear wall). Accordingly, the rear lift opening 132 generally divides the rear wall 122 into first and second rear wall flanges 122A, 122B (e.g., portions). The first and second rear wall flanges 122A, 122B each extend toward one another from the respective left or right side wall 124, 126. Similarly, the base 122 includes (e.g., defines) a bottom lift opening 134. The bottom lift opening 134 extends from the front end of the base 128 to the rear end of the base (e.g., the entire depth of the base). Accordingly, the bottom lift opening 134 generally divides the base 128 into first and second base flanges 128B (e.g., portions) (the first base flange is not shown). The first and second base flanges 128B each extend toward one another from the respective left or right side wall 124, 126. The rear and bottom lift openings 132, 134 are in communication (e.g., open communication) with one another at the bottom rear corner of the cartridge 116. When disposed in the receiver 104, the base 128 (e.g., base flanges 128B) rest on the supports 118 and the bottom lift opening 134 is generally aligned with the gap between the supports. As will be explained in more detail below, the lift openings 132, 134 enable the lift to extend into the interior 130 of the cartridge 116 and engage the pharmaceutical pouches P stacked therein. The cartridge 116 also includes two handles 136 connected to the front wall 120. Other configurations of the cartridge 116 are within the scope of the present disclosure.

The cartridge 116 allows a user or operator to quickly refill the receiver 104 with a stack S of pharmaceutical pouches P. When the receiver 104 (e.g., a first cartridge 116) is empty of pharmaceutical pouches P, the operator removes the empty cartridge from the receiver and replaces it with a cartridge full of pharmaceutical pouches. This allows the operator to stage cartridges 116 filled with pharmaceutical pouches P to quickly refill the receiver 104 once the receiver is empty. However, in other embodiments, the holding assembly 102 may not include a cartridge 116 and the receiver 104 may receive and store the pharmaceutical pouches P directly. In this embodiment, the operator may load (e.g., stack) the pharmaceutical pouches P directly into the interior 108 of the receiver 104 to refill the receiver.

The pharmaceutical pouches P may have a variety of different sizes (e.g., small, medium, large). For example, a typical large size pharmaceutical pouch P may have a length of about 6 inches and a width of about 3 inches, a typical medium size pharmaceutical pouch may have a length of about 5½ inches and a width of about 3 inches, and a typical small size pharmaceutical pouch may have a length of about 5 inches and a width of about 2½ inches. The use of pharmaceutical pouches of other sizes is within the scope of the present disclosure. Referring to FIGS. 3 and 4, medium size pharmaceutical pouches P are disposed in the right-most holding assembly 102, large size pharmaceutical pouches are disposed in the second right-most holding assembly and small size pharmaceutical pouches are disposed in the second left-most holding assembly (the left-most holding assembly is empty). The cartridge 116 is sized to correspond to the size of the pharmaceutical pouches P it holds. Accordingly, the cartridge 116 can have a variety of different sizes (e.g., small, medium, large) to match the size of the pharmaceutical pouch P the cartridge is configured to hold. Referring to FIGS. 3 and 4, a medium size cartridge 116 is disposed in the right-most holding assembly 102 for holding the stack S of medium size pharmaceutical pouches P, a large size cartridge is disposed in the second right-most holding assembly for holding the stack of large size pharmaceutical pouches and a small size cartridge is disposed in the second left-most holding assembly for holding the stack of small size pharmaceutical pouches. The pouches P can have a regular shape in the X-Y plane and be irregular in their Z plane (e.g., height or thickness dimensions). This irregular Z plane dimension makes it difficult for the pouches to stack vertical on top of one another and have a uniform position for the uppermost one of the pouches. The non-uniform position makes it difficult for a gripper to repeatedly engage an upper most one of a stack of pouches or the like. By supporting and bracing the stack S of pouches P in the receiver 104 (e.g., cartridge 116), the uppermost one of the pouches P is always disposed in generally the same or uniform position. This makes it possible for the gripper 14 to repeatedly engage the uppermost pouch.

The receiver 104 of the holding assembly 102 is adjustable to conform the interior 108 for pharmaceutical pouches P of different sizes. Specifically, in the illustrated embodiment, the receiver 104 includes one or more removable inserts 138 (e.g., a set of inserts) to conform the interior 108 to pharmaceutical pouches of different sizes. The inserts 138 conform the interior 108 to correspond to (e.g., match) the size of the cartridge 116 to be inserted therein. There is a set of inserts 138 (e.g., small set, medium set, large set) for each size of pharmaceutical pouch P (e.g., cartridge 116). When the cartridge 116 is disposed in the receiver 104, the cartridge is positioned by and generally disposed between the set of inserts 138. Each set of inserts 138 includes a front pair of inserts and a rear pair of inserts. The front pair of inserts 138 may include a lip configured to overlie the front wall 120 of the cartridge 116 to help retain the cartridge in the interior 108 of the receiver 104. The front and rear pair of inserts 138 each brace (e.g., engage) the side walls 124, 126 of the cartridge 116 (broadly, support the sides of the pharmaceutical pouches P) to limit or inhibit any side-to-side movement of the cartridge. Similarly, the lips of the front pair of inserts 138 and the rear wall 110 of the receiver brace (e.g., engage) the front and rear walls 120, 122 of the cartridge 116 (broadly, support the front and rear of the pharmaceutical pouches P) to limit or inhibit any front to rear movement of the cartridge. The inserts 138 are removably attached to the walls (e.g., side walls 112, 114) of the receiver 104 with fasteners (not shown), such as screws. To configure the receiver 104 to a particular size of pharmaceutical pouch P (e.g., cartridge 116), the operator selects and installs the set of inserts 138 corresponding to the size of the pharmaceutical pouch P. Referring to FIGS. 3 and 4, a medium insert set 138 for medium size pharmaceutical pouches P (e.g., a medium size cartridge 116) is installed on the right-most holding assembly 102, a large insert set for large size pharmaceutical pouches (e.g., a large size cartridge) is installed on the second right-most holding assembly, a small insert set for small size pharmaceutical pouches (e.g., a small size cartridge) is installed on the second left-most holding assembly and a second larger insert set is installed on the left-most holding assembly. Other ways of adjusting the size of the receiver 104 to conform the interior 108 to different sizes of pharmaceutical pouches P are within the scope of the present disclosure. For example, in other embodiments, side walls 112, 114 may move toward or away from one another to conform the interior 108. Accordingly, the holder 100 can be arranged to hold different sizes of pharmaceutical pouches P and, as illustrated, can hold different size of pharmaceutical pouches at the same time.

Figure 8:
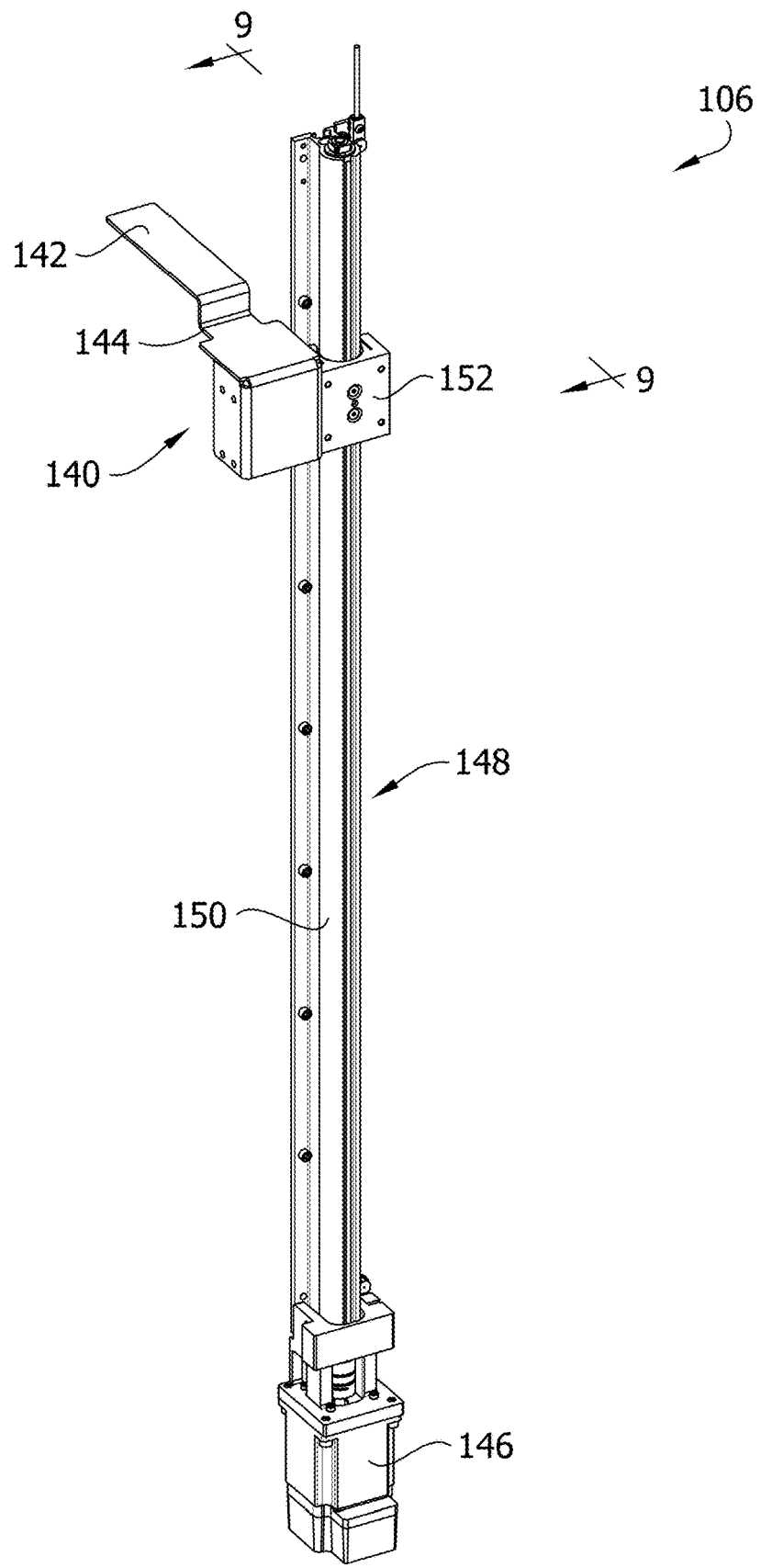
FIG. 8 is perspective of a lift of the pharmaceutical pouch holder.
Figure 9:
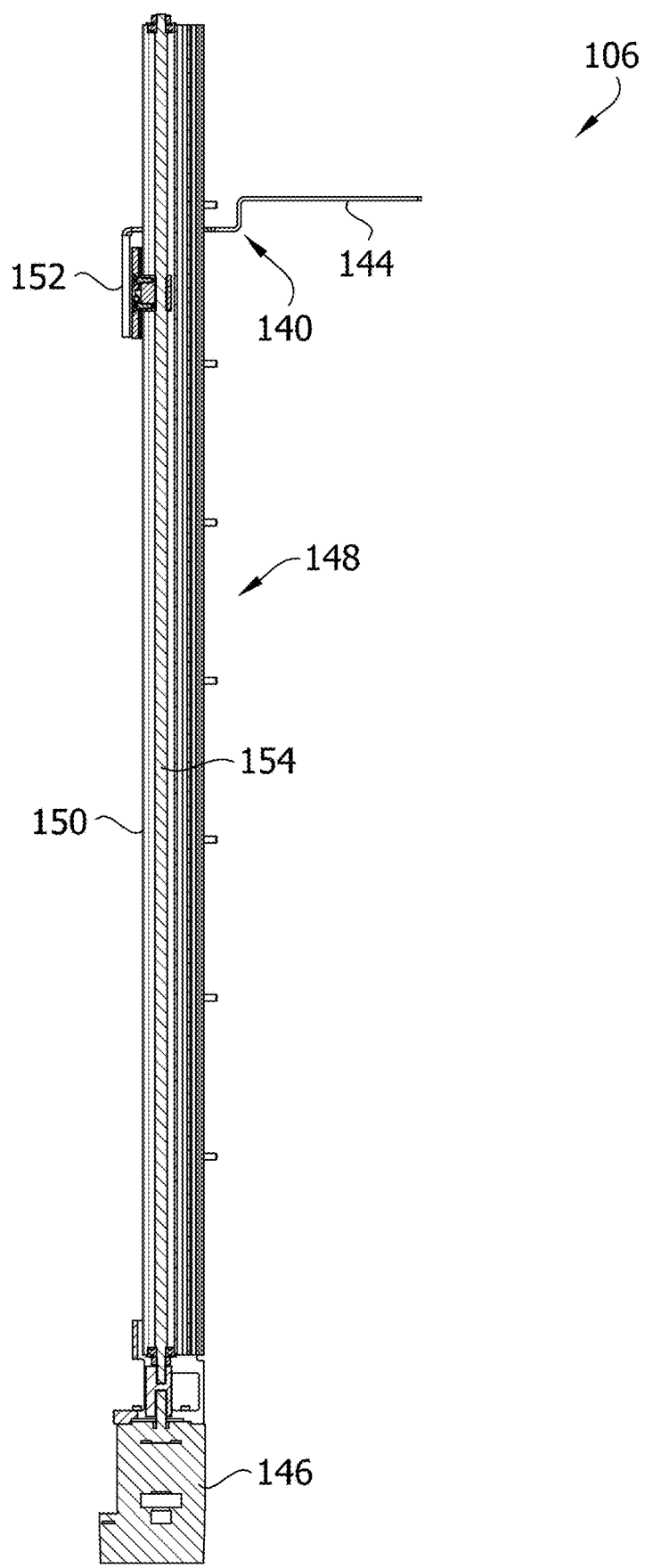
FIG. 9 is a cross section of the lift taken through line 9-9 of FIG. 8.

Referring to FIGS. 5, 8 and 9, the lift 106 of the holding assembly 102 is configured to raise the pharmaceutical pouches P disposed in the interior 108 of the receiver upward to move the pharmaceutical pouches toward the removal location. In particular, the lift is configured to engage the stack S of pharmaceutical pouches P to raise the pharmaceutical pouches disposed in the interior 130 of the cartridge 116 upward to move the pharmaceutical pouches toward the upper opening 135 of the cartridge. As mentioned above, the pharmaceutical order processor 10 removes the upper-most pharmaceutical pouch P from the stack S as needed to fill prescription orders. The lift 106 moves the stack S of pharmaceutical pouches P upward after the upper-most pharmaceutical pouch is removed to move the subsequent upper-most pharmaceutical pouch to the removal location, thereby positioning the subsequent upper-most pharmaceutical pouch at the removal location to be grabbed by the pharmaceutical order processor 10. This process repeats (e.g., the lift 106 continues to rise) as the pharmaceutical pouches P are removed from the stack S until there are no more pharmaceutical pouches P in the receiver 104.

The lift 106 includes a riser 140 configured to engage and raise the stack S of pharmaceutical pouches P. In the illustrated embodiment, the riser 140 engages the lower-most pharmaceutical pouch P (FIG. 5) of the stack S to raise all the pharmaceutical pouches toward the removal location. The riser 140 raises the pharmaceutical pouches P upward in the interior 108 of the receiver 104 (e.g., interior 130 of the cartridge 116). The riser 140 includes a pouch support surface 142 configured to engage and support the lower-most pharmaceutical pouch P. The pouch support surface 142 is planar and is generally horizontal. In the illustrated embodiment, the riser 140 includes a bracket (e.g., flange) 144 that includes the pouch support surface 142 and is disposed (at least partially disposed) in the interior 108 of the receiver 104.

The lift 106 also includes a prime mover 146 operatively coupled to the riser 140 and configured to move (e.g., raise and lower) the riser. The prime mover 146 may be an electric motor, a stepper motor, a servo motor, a solenoid, or any other suitable device. The lift 106 includes a drivetrain 148 operatively coupling the prime mover 146 to the riser 140. The drivetrain includes a track 150 and a carriage 152 movable along the track. The riser 140 is coupled to the carriage 152. The track 150 is generally linear and extends generally vertically. The drivetrain 148 includes a threaded drive shaft 154 (FIG. 9) coupled (e.g., operatively coupled) to the prime mover 146. The prime mover 146 is configured to rotate the threaded drive shaft 154 to move the carriage 152 along the track 150. The carriage 152 is coupled to the threaded drive shaft 154. The carriage 152 includes internal threads that mate with the external threads of the drive shaft 154. Accordingly, as the drive shaft 154 is rotated, the threads of the carriage 152 and drive shaft 154 engage one another to move the carriage, and therefore the riser 140, along the track 150. For example, the prime mover 146 may rotate the drive shaft 154 clockwise to move the carriage 152 and riser 140 upward to raise the stack S of pharmaceutical pouches P and may rotate the drive shaft counter-clockwise (e.g., in the opposite direction) to lower the carriage and riser. In the illustrated embodiment, the track 150 has a generally circular cross-sectional shape that partially surrounds the drive shaft 154. The carriage 152 has a corresponding recess with a generally circular cross-sectional shape that receives the track 150 to mount the carriage on the track. Other configurations of the lift are within the scope of the present disclosure.

Still referring to FIG. 5, the lift 106 is mounted to the receiver 104. Specifically, the track 150 of the lift 106 is attached to the rear wall 110 (e.g., a rear surface thereof) of the receiver 104. The riser 140 of the lift 106 extends into the interior 108 of the receiver 104 to engage the stack S of pharmaceutical pouches P (e.g., the lower-most pharmaceutical pouch). The rear wall 110 includes a receiver lift opening 156 through which the riser 140 extends. The receiver lift opening 156 is elongate and extends generally vertically. The receiver lift opening 156 extends along most of the height of the rear wall 110, from adjacent a lower end of the rear wall to adjacent an upper end of the rear wall. When the cartridge 116 is disposed in the receiver 104, the receiver lift opening 156 and the rear lift opening 132 of the cartridge are aligned with one another, allowing the riser 140 to extend therethrough. Accordingly, the receiver lift opening 156 and the rear lift opening 132 are both sized and shaped to receive the riser 140. In addition, when the cartridge 116 is disposed in the receiver 104, the bottom lift opening 134 and the gap between the supports 118 are aligned with one another, allowing the riser 140 to move through the gap and bottom lift opening. In operation, the lift 106 (e.g., the riser 140) moves through the receiver lift opening 156 and the rear lift opening 132 of the cartridge 116 to raise the pharmaceutical pouches P. Initially, the riser 140 may be positioned below the supports 118 to allow the cartridge 116 to be loaded into the receiver 104. After the cartridge 116 is loaded, the riser 140 may be moved upward by the prime mover 146 through the gap between the supports 118 and the bottom lift opening 134 to engage the lower-most pharmaceutical pouch P. The prime mover 146 may continue to move the riser 140 upward in the receiver lift opening 156 and the rear lift opening 132 as need to move the stack S of pharmaceutical pouches P toward the removal location to replace the upper-most pharmaceutical pouch taken by the pharmaceutical order processor 10 with the subsequent upper-most pharmaceutical pouch.

Referring back to FIG. 4, the receiver 104 may include one or more keepers 160. The keepers 160 ensure that only one pharmaceutical pouch P is removed at a time by the pharmaceutical order processor 10. In the illustrated embodiment, the receiver 104 includes at least one keeper 160 on each side of the receiver. Each keeper 160 is configured to engage a pharmaceutical pouch P (e.g., the subsequent upper-most pharmaceutical pouch) to retain or keep the pouch in the receiver 104 (e.g., cartridge 116) when the upper-most pharmaceutical pouch is removed from the removal location. For example, in some situations, the pharmaceutical pouches P in the stack S may stick together. In this case, the keeper 160 engages the subsequent upper-most pharmaceutical pouch P as the upper-most pharmaceutical pouch is removed by the pharmaceutical order processor 10 to prevent the subsequent upper-most pharmaceutical pouch that is stuck to the upper-most pharmaceutical pouch from being removed with the upper-most pharmaceutical pouch. The keepers 160 are attached to the upper end of the side walls 112, 114 of the receiver 104. Each keeper 160 includes a tab 162 having an elongate slot through which a fastener 164 (e.g., bolt with a washer) extends to attach the keeper to the side wall 112, 114. The elongate slot permits the positon of the tab 162 relative to the pharmaceutical pouches P to be adjusted as needed (e.g., adjust the keeper 160 to the size of the pharmaceutical pouches). In operation, if the keeper 160 is used, the keeper is positioned such that the tab 162 overlies a portion of the upper opening 135 so that the keeper will engage the pharmaceutical pouch P as it is removed. As the pharmaceutical order processor 10 removes the upper-most pharmaceutical pouch P, the processor moves the pouch past the keeper 160. The pharmaceutical pouch P may be flexible and deflect around the keeper 160. As the upper-most pharmaceutical pouch P is moved, if the subsequent upper-most pharmaceutical pouch is stuck thereto, the subsequent upper-most pharmaceutical pouch will move with the upper-most pharmaceutical pouch. This movement will bring the subsequent upper-most pharmaceutical pouch into engagement with the keeper 160, which will retain and inhibit (e.g., block) further movement of the subsequent upper-most pharmaceutical pouch, thereby separating the pharmaceutical pouches and keeping the subsequent upper-most pharmaceutical pouch in the receiver 104.

Still referring to FIG. 4, the holding assembly 102 may also include a pouch sensor 166. The pouch sensor is configured to detect the presence of a pharmaceutical pouch P in the removal location of the receiver 104. The pouch sensor 166 may be any suitable sensor for detecting the presence of a pharmaceutical pouch such as but not limited to a proximity sensor (e.g., a photoelectric sensor). The pouch sensor 166 is aligned (e.g., coplanar) with the removal location to detect the presence of a pharmaceutical pouch P at the removal location. In the illustrated embodiment, the pouch sensor 166 is attached to the upper end of one of the side walls 112, 114 of the receiver 104. In addition, in the illustrated embodiment, the cartridge 116 (e.g., side walls 124, 126) includes a window 168 (FIG. 6) aligned with the removal location to provide a line-of-sight between the removal location (and the pharmaceutical pouch P therein) and the pouch sensor 166.

Referring back to FIGS. 3-5, the holding assemblies 102 of the holder 100 are secured (e.g., fixed together). The holder 100 includes a housing 170. The housing 170 includes the walls 110, 112, 114 of the receivers 104. In the illustrated embodiment, housing 170 includes a rear wall, which comprises the rear walls 110 of the receivers 104 all integrally formed together as a one-piece component. The housing 170 also includes left and right (e.g., first and second) side walls comprising the respective left side wall 112 of the left-most receiver 104 and the right side wall 114 of the right-most receiver. In the illustrated embodiment, adjacent receivers 104 may share a single side wall 112, 114 (e.g., an intermediate wall of the housing 170) that forms the left side wall for one receiver and the right side wall for another receiver. The holder 100 includes mounting brackets 172 for mounting the holder to the pharmaceutical order processor 10. Each mounting bracket includes a slide rail 174 (e.g., drawer slide) connected to the housing 170 of the holder 100. The slide rails 174 allow the operator to move the holder 100 relative to the pharmaceutical order processor 10 between a loading position (FIG. 1) and a supply position (FIG. 2). In the loading position, the holder 100 is generally disposed outside of an enclosure 20 of the pharmaceutical order processor 10. This permits access to the holder 100 to allow the operator to re-fill any empty receivers with additional pharmaceutical pouches P (e.g., load a pre-filled cartridge 116). The enclosure 20 may include a door 22 that opens to permit the operator to move the holder 100 to the loading position. Once the holder 100 is loaded, the operator moves (e.g., slides) the holder 100 to the supply position. In the supply position, the holder 100 is positioned inside the enclosure 20 and is reachable and accessible to the transporter 12 to remove pharmaceutical pouches P therefrom.

Figure 10:
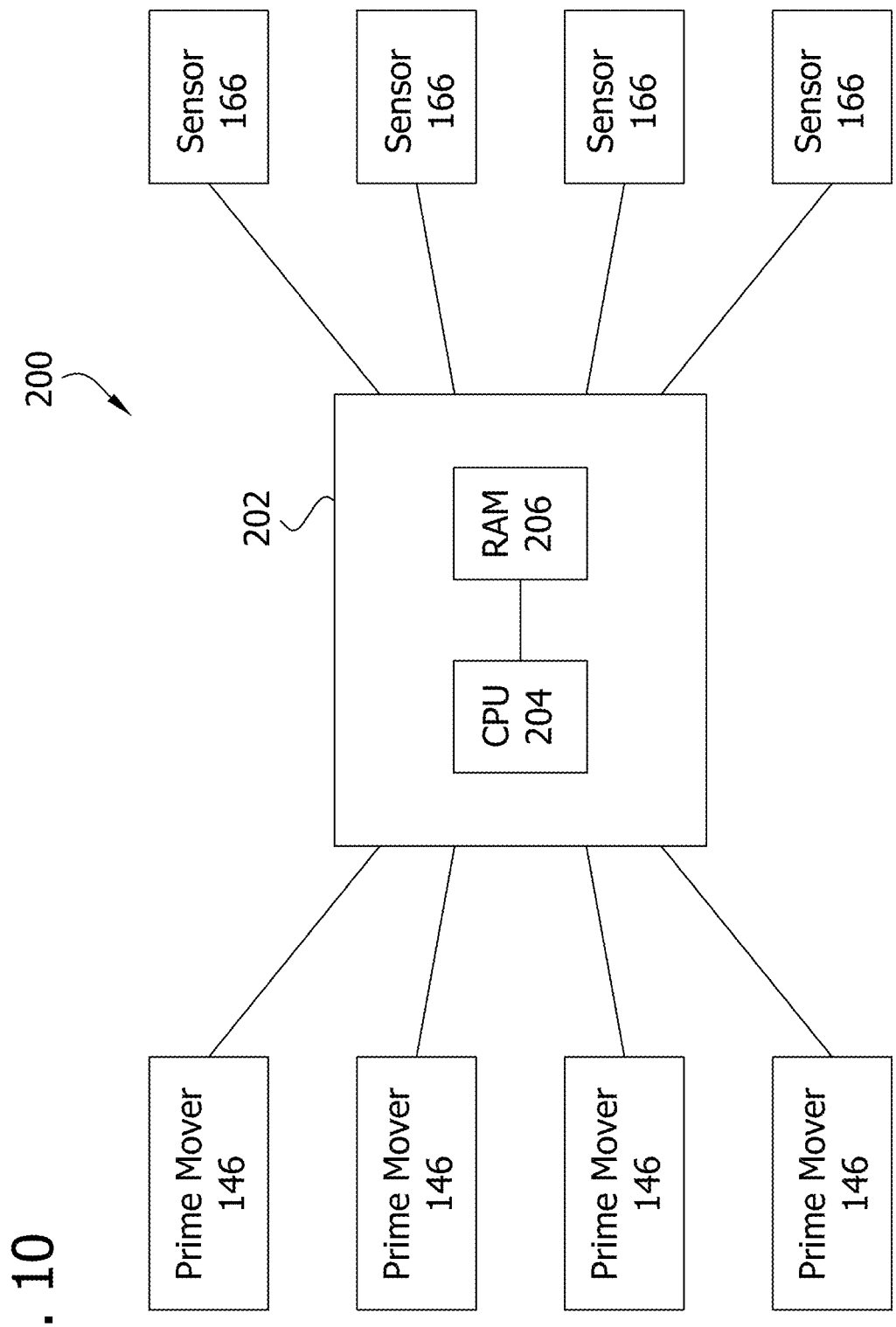
FIG. 10 is a diagram of an exemplary control system of the pharmaceutical container processing system.

Referring to FIG. 10, an exemplary control system (e.g., holder control system) of the holder 100 is generally indicated by reference numeral 200. The control system 200 includes a lift controller 202 (broadly, a computer) for controlling the operation of the holder 100. In the illustrated embodiment, the controller 202 is a dedicated controller for the holder 100 and may be in communication with other components of the pharmaceutical order processing system (e.g., the pharmaceutical order processor 10). In other embodiments, the controller 202 may be an existing controller of the pharmaceutical order processing system (e.g., the controller for the pharmaceutical order processor 10 may also control the holder 100). The controller 202 controls the one or more holding assemblies 102 (e.g., lifts 106). The controller 202 includes a CPU or processor 204 (e.g., a holder processor) and RAM or memory 206 (broadly, non-transitory computer readable storage medium). The controller 202 controls and operates the various components (e.g., lifts 106, pouch sensors 166) of the holder 100. Broadly, the memory 206 includes (e.g., stores) processor-executable instructions for controlling the operation of the holder 100 and the components thereof. The instructions embody one or more of the functional aspects of the holder 100 and the components thereof, with the processor 202 executing the instructions to perform said one or more functional aspects. The components of the holder 100 may be in wired or wireless communication with the controller 202. Other configurations of the control system 200 are within the scope of the present disclosure.

The controller 202 is communicatively coupled to each lift 106 (e.g., each prime mover 146). The controller 202 is configured to operate each lift to move the pharmaceutical pouches P upward toward the removal location after the upper-most pharmaceutical pouch of the stack S has been removed from the removal location to move the subsequent upper-most pharmaceutical pouch to the removal location. The controller 202 is communicatively coupled to each pouch sensor 166. The controller 202 operates each lift 106 based on information or signals received from the corresponding pouch sensor 166. The controller 202 is configured to operate each lift 106 (e.g., prime mover 146) to move the corresponding pharmaceutical pouches P upward when the pouch sensor 166 does not detect the presence of the pharmaceutical pouch in the removal location until the pouch sensor detects the presence of a pharmaceutical pouch (e.g., subsequent upper-most pharmaceutical pouch). When a pharmaceutical pouch P (e.g., upper-most pharmaceutical pouch) is in the removal location, the pouch sensor 166 detects the presence of the pouch and informs (e.g., sends a signal to) the controller 202 accordingly. Once the upper-most pharmaceutical pouch P is removed from the removal location, by the pharmaceutical order processor 10, the pouch sensor 166 no longer detects a pouch in the removal location and informs the controller 202. The controller 202 then operates the lift 106 (e.g., prime mover 146) to raise the riser 140 and stack S of pharmaceutical pouches P until the subsequent upper-most pharmaceutical pouch is positioned at the removal location. Once the subsequent upper-most pharmaceutical pouch P enters the removal location, its presence is detected by the pouch sensor 166, which informs the controller 202. Upon receiving the signal from the pouch sensor 166 that a pharmaceutical pouch P is now in the removal location, the controller 202 stops the movement of the lift 106 (e.g., prime mover 146). Accordingly, the controller 202 generally conducts a closed loop process or routine to repeatedly move the stack S of pharmaceutical pouches P upward to replace the pharmaceutical pouch removed from the removal location.

In one embodiment, the holder 100 may also include a holder sensor (not shown) to detect whether the holder is in the supply position. The holder sensor may be similar to the pouch sensor (e.g., a proximity sensor). The holder sensor may be in communication with the controller 202 or in direct communication with the pharmaceutical order processor 10. The holder sensor informs the controller 202 or pharmaceutical order processor 10 whether or not the holder 100 is in the supply position. In the embodiment where the holder sensor informs the controller 202, the controller 202 may then relay this information to the pharmaceutical order processor 10. The pharmaceutical order processor 10 uses this information to determine whether it can grab pharmaceutical pouches P from the holder. For example, if the holder sensor indicates the holder 100 is in the supply position, then the pharmaceutical order processor 10 knows it can operate the transporter 12 to grab and remove pharmaceutical pouches P from the holder. If the holder sensor indicates the holder 100 is not in the supply position, then the pharmaceutical order processor 10 know it cannot retrieve pharmaceutical pouches P from the holder but may continue to operate and grab pharmaceutical containers from other sources. This way, the pharmaceutical order processor 10 may continue to process other prescription orders while the holder 100 is being re-filled (in the loading position) and then come back to the holder once it is filled and in the supply position.

Dispensing unit of use products greatly limits the need for manual or automated filling of open prescription containers with drugs that are first counted and then sealed at the pharmacy. Such dispensing unit of use products can be performed automatically using the systems and processes described herein. The present system and methods can operate to order and feed for picking or selection of irregular-shaped packaging, e.g., blister packs, vacuum-sealed packaging, and the like. The irregular-shaped packaging can be such that a plurality that is stored in a vertical stack cannot stand on one another due to the irregular shape. For example, the stack would tip over and fall or the upmost one of the packages would not be in a repeatable position, which makes automated picking difficult or error-prone (e.g., when the picking is performed off the top of the stack).

Various example embodiments have described removing the uppermost pouch from a stack of pouches supported in a receiver. It is believed that removing the uppermost pouch that is moved into the selection position at the top of the receiver may result in fewer dispensing errors compared to removing a lowermost pouch from a bottom of a stack. The irregular shape of many pouch types can create binding locations relative to adjacent pouches and/or cause a stack to shift and possibly jam in a receiver as the pouches move downwardly under the force of gravity if a pouch is removed from bottom of the stack.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A pharmaceutical container holder for holding difficult to stack irregular pharmaceutical containers for a pharmaceutical order processor; the holder comprising:
   a receiver having opposite side walls defining an elongate interior sized and shaped to receive the irregular pharmaceutical containers as a stack of pharmaceutical containers, the opposite side walls arranged to support and hold the irregular pharmaceutical containers in the stack, the receiver having an upper removal location from which the irregular pharmaceutical containers are removed from the receiver, the interior having an open top aligned with the upper removal location, the open top facing upward and sized, shaped, and arranged to permit the irregular pharmaceutical containers to move upward through the open top;
   a lift configured to raise the irregular pharmaceutical containers disposed in the interior of the receiver upward to move the irregular pharmaceutical containers toward the removal location, the interior of the receiver and the lift being in a fixed position relative to one another; and
   a lift controller configured to operate the lift to move the irregular pharmaceutical containers upward toward the removal location after an upper-most irregular pharmaceutical container of the stack of pharmaceutical containers has been removed from the removal location to move a subsequent upper-most irregular pharmaceutical container of the stack of pharmaceutical containers to the removal location.

2. The pharmaceutical container holder of claim 1, further comprising a container sensor configured to detect the presence of an irregular pharmaceutical container in the removal location.

3. The pharmaceutical container holder of claim 2, wherein the container sensor is communicatively coupled to the lift controller, the lift controller configured to operate the lift to move the irregular pharmaceutical containers upward when the container sensor does not detect the presence of an irregular pharmaceutical container in the removal location until the container sensor detects the presence of an irregular pharmaceutical container.

4. The pharmaceutical container holder of claim 1, wherein the receiver is adjustable to conform the interior for irregular pharmaceutical containers of different sizes.

5. The pharmaceutical container holder of claim 4, wherein the receiver includes one or more removable inserts to conform the interior to irregular pharmaceutical containers of different sizes.

6. The pharmaceutical container holder of claim 1, further comprising a container cartridge configured to hold the stack of pharmaceutical containers, the container cartridge sized and shaped to be inserted into the interior of the receiver.

7. The pharmaceutical container holder of claim 6, wherein the lift is configured to move the irregular pharmaceutical containers upward in the container cartridge toward the removal location of the receiver.

8. The pharmaceutical container holder of claim 6, wherein the container cartridge includes opposite side walls sized, shaped, and arranged to be inserted between the side walls of the receiver.

9. The pharmaceutical container holder of claim 1, wherein the lift includes a riser configured to engage a lower-most irregular pharmaceutical container of the stack of pharmaceutical containers to raise the irregular pharmaceutical containers in the interior of the receiver toward the removal location.

10. The pharmaceutical container holder of claim 9, wherein the lift includes a prime mover operatively coupled to the riser and configured to move the riser.

11. The pharmaceutical container holder of claim 10, wherein the lift includes a drivetrain operatively coupling the prime mover to the riser.

12. The pharmaceutical container holder of claim 11, wherein the drivetrain includes a track and a carriage movable along the track, the riser being coupled to the carriage.

13. The pharmaceutical container holder of claim 12, wherein the drivetrain includes a threaded drive shaft coupled to the prime mover and the carriage, the prime mover configured to rotate the threaded drive shaft to move the carriage along the track.

14. The pharmaceutical container holder of claim 1, wherein the receiver includes a keeper configured to engage the subsequent upper-most irregular pharmaceutical container to retain the subsequent upper-most irregular pharmaceutical container in the receiver when the upper-most irregular pharmaceutical container is removed from the removal location.

15. The pharmaceutical container holder of claim 1, wherein the receiver is a first receiver, the removal location is a first removal location and the lift is a first lift, the holder further comprising:
  a second receiver having an interior sized and shaped to receive and hold irregular pharmaceutical containers as a second stack of pharmaceutical containers, the second receiver having a second removal location adjacent an upper end of the second receiver and from which the irregular pharmaceutical containers are removed from the second receiver; and
  a second lift configured to raise the irregular pharmaceutical containers disposed in the interior of the second receiver upward to move the irregular pharmaceutical containers toward the second removal location adjacent the upper end of the second receiver;
  wherein the lift controller is configured to operate the second lift to move the irregular pharmaceutical containers held in the second receiver upward toward the second removal location after an upper-most irregular pharmaceutical container of the second stack of pharmaceutical containers has been removed from the second removal location to move a subsequent upper-most irregular pharmaceutical container of the second stack of pharmaceutical containers to the second removal location.

16. The pharmaceutical container holder of claim 1, in combination with the pharmaceutical order processor.

17. The pharmaceutical container holder of claim 16, wherein the holder is movable relative to the pharmaceutical order processor between a loading position and a supply position.

18. The pharmaceutical container holder of claim 16, wherein the pharmaceutical order processor includes a transporter configured to remove irregular pharmaceutical containers from the removal location.

19. The pharmaceutical container holder of claim 18, wherein the transporter includes a gripper configured to grip each irregular pharmaceutical container.

20. The pharmaceutical container holder of claim 19, wherein the gripper includes a suction head configured to apply suction to each irregular pharmaceutical container to grip the irregular pharmaceutical container, suction head including at least two bellow suction cups.

21. The pharmaceutical container holder of claim 1, wherein each of the side walls comprises a solid wall.

22. A pharmaceutical container holder for holding difficult to stack irregular pharmaceutical containers for a pharmaceutical order processor; the holder comprising:
  a cartridge having an interior that is sized and shaped to receive and hold the irregular pharmaceutical containers as a stack of pharmaceutical containers, the cartridge having a lift opening and an upper opening, the upper opening facing upward and sized and shaped to permit the irregular pharmaceutical containers to be removed from the cartridge;
  a receiver having one and only one interior sized and shaped to receive and hold the cartridge, the interior of the receiver sized and shaped to receive one and only one cartridge at a time, the interior having an open top facing upward, the open stop sized and shaped to permit the irregular pharmaceutical containers to move upward through the open top, wherein the open top of the receiver and the upper opening of the cartridge are aligned with one another when the cartridge is received in the receiver to permit the irregular pharmaceutical containers to move upward out of the pharmaceutical container holder; and
  a lift movable in the lift opening while the cartridge is received in the interior of the receiver, the lift being configured to engage the stack of pharmaceutical containers to raise the irregular pharmaceutical containers disposed in the interior of the cartridge upward to move the irregular pharmaceutical containers toward the upper opening.

23. The pharmaceutical container holder of claim 22, wherein the receiver includes opposite side walls defining the interior, the opposite side walls defining an open top of the interior, the open top sized and shaped to permit the cartridge to move vertically therethrough to move the cartridge into and out of the interior of the receiver.

* * * * *